United States Patent [19]

Meyer et al.

[11] 3,853,924

[45] Dec. 10, 1974

[54] RECOVERY OF TRIMELLITIC ACID FROM PSEUDOCUMENE LIQUID PHASE OXIDATION EFFLUENT

[75] Inventors: Delbert H. Meyer, Naperville; George E. Johnston, Chicago, both of Ill.

[73] Assignee: Standard Oil Company, Chicago, Ill.

[22] Filed: Dec. 22, 1970

[21] Appl. No.: 100,817

[52] U.S. Cl............. 260/346.3, 260/346.4, 260/525
[51] Int. Cl.............................................. C07c 63/32
[58] Field of Search............... 260/346.4, 525, 346.3

[56] References Cited
UNITED STATES PATENTS
3,484,458   12/1969   Stein et al....................... 260/346.4

*Primary Examiner*—Henry R. Jiles
*Assistant Examiner*—Bernard T. Dentz
*Attorney, Agent, or Firm*—Fred R. Ahlers; Arthur G. Gilkes; William T. McClain

[57] ABSTRACT

Enhanced recovery of trimellitic acid from liquid phase oxidation effluent that contains a substantial portion of the acid product as solute in acetic acid solvent by concentrating the effluent by use of heat values in the effluent to precipitate a first crop of acid product, displacing and replacing mother liquor with fresh acetic acid of low water content to a first slurry of 60 to 70 percent solids and 40 to 30 percent liquid, further concentrating displaced effluent mother liquor by removal of 80 to 90 percent of its solvent content, displacing and replacing the remaining 20 to 10 percent of solvent with fresh acetic acid of low water content to a second slurry of 60 to 70 percent solids and 40 to 30 percent liquid, combining and removing solvent from the first and second slurries. Advantageously by the use of those steps heat is not wasted, conventional crystallization is avoided and apparatus is minimized by the practice of that combination of procedural steps. The recovered trimellitic acid product can be converted to its intramolecular anhydride or inter- and intra-bis-anhydride.

4 Claims, No Drawings

3,853,924

RECOVERY OF TRIMELLITIC ACID FROM PSEUDOCUMENE LIQUID PHASE OXIDATION EFFLUENT

BACKGROUND OF INVENTION

U.S. Pat. No. 3,484,458 discloses a process for the manufacture of the intramolecular anhydride (4-carboxyphthalic anhydride) of trimellitic acid through a combination of steps. Briefly that process comprises the steps of air oxidation of pseudocumene under liquid phase conditions in the presence of heavy metal catalysts and acetic acid having 2–5 percent water. The oxidation effluent is cooled in two steps by surface evaporation of a mixture of acetic acid and water to crystallize trimellitic acid which is separated from the acetic acid mother liquor and washed with acetic acid of 2 to 5 percent water content. The acetic acid mother liquor and wash liquor are combined and concentrated by removing acetic acid and water in an amount equal to the sum of acetic acid wash and 65–75 percent of the acetic acid content of the mother liquor. The concentrate is added to the two step crystallization either with the oxidation effluent or to the effluent from the first crystallization step. The acetic acid-water mixture removed during the concentrating step is distilled to recover an acetic acid concentrate having 2–5 percent water for reuse as oxidation solvent. The separated crystalline trimellitic acid is added to a pool of molten crude trimellitic acid anhydride at a temperature of 400°–500°F. and a pressure of 200 mm Hg. to 1.0 atmosphere to convert trimellitic acid to its acid anhydride. An amount of crude acid anhydride is withdrawn from the pool of molten acid anhydride in an amount having an acid anhydride content equivalent to trimellitic acid charged to said pool. The withdrawn crude acid anhydride is distilled at a temperature of 575°F. to 425°F. and an absolute pressure of 10–55 mm Hg. top pressure. The distilled fraction is condensed as the acid anhydride product.

The oxidation is conducted with 2–6 weight parts of acetic acid per weight part $C_9$ aromatic hydrocarbon having a pseudocumene content of at least 91 percent at a temperature of 325°–455°F. and a pressure in the range of 170–410 pounds per square inch gauge. The two step crystallization is conducted first at a temperature of 320°–285°F. and an absolute pressure of 63–39 pounds per square inch and in the second step at a temperature of 120°–140°F. and an absolute pressure of 75–115 mm Hg. Such oxidation provides an effluent at 325°–450°F. having 36–50 parts of trimellitic acid by weight per 100 parts acetic acid on a weight basis. The water content of the effluent can be as high as 15 weight percent. There is also present co- and by-products amounting to 0.01–0.03 of the trimellitic acid and metal compounds amounting to 0.001–0.003 of the trimellitic acid.

The present inventive process provides an improvement for the foregoing process wherein first and second crops of trimellitic acid crystals from mother liquor concentrates are displacement washed by acetic acid of low water content, below 5 percent water. This displacement washing technique affords advantages in reduction of pump sizes and equipment space over conventional crystallization apparatus.

SUMMARY OF THE INVENTION

Enhanced recovery of trimellitic acid from the oxidation of pseudocumene in the presence of acetic acid solvent results from the use of the present inventive combination of procedural steps. That combination of steps comprises concentrating the liquid phase oxidation effluent through the use of its heat content to remove a mixture of water and acetic acid vapors. Such a concentration precipitates a first crop of product acid. Mother liquor portion of the remaining effluent solvent is displaced and replaced by fresh acetic acid of low, below 5 weight percent, water content in an amount to provide a first slurry of 60 to 70 weight percent solids and 40 to 30 weight percent fresh acetic acid. The displaced mother liquor is further concentrated by removal of 80 to 90 weight percent of its solvent content and thus yielding a second product acid precipitate in 20 to 10 weight percent of mother liquor solvent. The residual 20 to 10 percent of mother liquor solvent. The residual 20 to 10 percent of mother liquor solvent is displaced and replaced with fresh acetic acid of low, below 5 weight percent, water content to provide a second slurry of 60 to 70 weight percent solids and 40 to 30 weight percent liquid. Those first and second slurries are combined and acetic acid is removed leaving trimellitic acid product.

The preferred form of the foregoing improvement for manufacture of trimellitic acid anhydride (TMA), 4-carboxy phthalic anhydride, is as follows. Trimellitic acid in the foregoing first and second slurries is processed by charging those slurries to a melter-dehydrator zone containing molten TMA at a temperature above 325°F., preferably in the range of 350° to 465°F. Acetic acid vapor and water (water from both acetic acid and conversion of the triacid to anhydride) are vaporized and are withdrawn from said zone. An amount of the resulting pool of molten TMA equivalent to the trimellitic acid content of the slurries can be withdrawn and fractionated to recover TMA condensate as high purity product for immediate use in reactions (e.g., esterification, alkyl resin formation or urethanetype product manufacture) or for preparation of flake and/or briquette product for storage and/or shipping.

From the present inventive combination of procedural steps several streams of mixtures of acetic acid and water vapors are obtained. These steams as well as that from conversion of trimellitic acid to TMA can be charged to the fractionation column used in the concentrating of aqueous acetic acid of above 5 percent water content to a product of low, downward from 5 weight percent, water content. This acetic acid concentrate product can be used to provide the acetic acid for formation of the first and second slurries and the solvent for pseudocumene oxidation. By use of those vapor streams rather than condensate in that fractionation, less extra heat need be supplied for that fractionation.

The present inventive combination of procedural steps is advantageously applied to liquid oxidation effluent resulting from catalytic liquid phase air oxidation of pseudocumene before described providing a liquid oxidation effluent at 325° to 455°F. and pressure of 170–410 p.s.i.g. The oxidation effluent is concentrated by flashing off acetic acid and water vapor to a lower pressure and temperature. Maximum use of heat content of the liquid effluent is achieved by flashing off water and acetic acid vapors in a zone operated at atmospheric pressure. The flash zone can be operated at higher pressures, if desired, especially when the lower water content effluents are used. For example, when a liquid oxidation effluent of 3 to 5 percent water content is used, there need be flashed off and condensed only that amount of water and acetic acid required for one or both of the mother liquor displacement and replacement steps for obtaining the first and/or second slurries of 60 to 70 percent solids and 40 to 30 percent liquid. For liquid oxidation effluents having more than 5 and up to 15 percent water, the flash zone is preferably operated at atmospheric pressure because by such an operation more water is removed with the acetic acid and lower water content mother liquors are provided. This is advantageous because, as previously pointed out trimellitic acid although soluble in wet acetic acid has its solubility decreased as the water content of acetic acid decreases.

Displacement and replacement of mother liquor from the first and second crops of trimellitic acid precipitates can be conducted in any apparatus suitable for this purpose, for example settling tank. But the optimum reduction in apparatus and, therefore, plant size is achieved by the use of liquid cyclones. Liquid cyclones provide the necessary mother liquor displacement and replacement by low water content acetic acid and the precipitate slurry (first and second) by centrifugal and centripetal forces. The slurry of precipitate in mother liquor and low water content acetic acid are fed tangentially to the liquid cyclone, displaced mother liquor diluted with low water content acetic acid is discharged as overflow and 60 to 70 percent precipitate slurry in low water content acetic acid is discharged as underflow. The use of a single liquid cyclone or a combination of feed, overflow and underflow paralled manifolded relatively small liquid cyclones not only occupy very little plant area but also reduce the size of fluid pump necessary to provide the fluid flow rate for those separating forces in the liquid cyclones. For the processing of the same volume of liquid oxidation effluent by conventional crystallization and its required solid-liquid separation, the use of liquid cyclones to provide both steps of displacement and replacement of mother liquor (the formation of first and second slurries of about 50 percent solids content) require less plant area than need for one continuous centrifuge for solid-liquid separation.

Moreover, less first and second displaced mother liquor need be concentrated for second crop trimellitic acid precipitation than for concentration of mother liquor from conventional crystallization practiced on oxidation effluent for first crop acid precipitation. Thus a savings in apparatus size and heat supply are advantages from the combination of procedural steps of the present invention. Also solid-liquid separators and their auxiliary pump and transfer lines are eliminated. Condensers and condensate receivers are eliminated in the handling of aqueous acetic acid vapor streams as well as the heat for revaporizing those condensates for recovery of reusable acetic acid of low, downward from 5 percent, water content. Further, the first and second slurries of about 50 percent solids content can be discharged directly into the pool of molten TMA in the melter-dehydrator zone where the triacid is converted to its anhydride.

The combination of procedural steps of this invention will be further described by specific illustrative embodiments thereof.

EXAMPLE

A liquid oxidation effluent at a temperature of 410°F. and 325 pounds per square inch gauge having the following composition based on 100 pounds of aqueous acetic acid (81 percent acetic acid-19 percent water by weight):

37.7 weight parts trimellitic acid,
100.0 weight parts aqueous acetic acid (18.8 percent water) and
5.4 total weight parts impurities The oxidation effluent is charged to a flash zone operated at atmospheric pressure from which the wet acetic acid vapors are withdrawn and transferred to the stripping zone of a fractionation tower operated at atmospheric pressure for the recovery of 97 percent acetic acid (3 percent water). The resulting concentrate is at atmospheric pressure and 222°F. The amount of wet acetic acid vaporized is 29.2 pounds per 100 pounds of effluent charged to the flash zone. The concentrate contains 29.0 percent precipitated solids and 71 percent mother liquor by weight. This concentrate is charged to a liquid cyclone to obtain an underflow of 60 percent solids and 40 percent liquid. The overflow mother liquor is collected for concentration. The underflow and 97 percent acetic acid - 3 percent water wash liquid are charged to a liquid cyclone to displace the remaining mother liquor and replace it with wet acetic acid (3 percent water) and provide a slurry of 60 percent solids in 40 percent liquid. The overflow is collected with the previous overflow and the combination is heated to remove 75 percent of the mother liquor solvent. The second concentrate is diluted with 97 percent acetic acid - 3 percent water as it is charged to a liquid cyclone to obtain a slurry underflow of 60 percent solids - 40 percent liquid. The overflow is transferred to a residue kettle and heated to remove wet acetic acid vapors and leave a residue flowable at 475°F.

The residue is withdrawn and discarded.

The first and second slurries of 60percent solids are charged to a melter-dehydrater zone operated at atmospheric pressure and containing molten TMA at 475°F. The vaporized wet (3 percent water) acetic acid passes through a hot condenser operated at a temperature to condense only TMA vapors swept from the surface of the pool of molten TMA by wet acetic acid vapors. The TMA condensate is returned to the pool. Liquid TMA in an amount equivalent to the trimellitic acid content of the first and second slurries of 60 percent solids content is withdrawn from the meltadehydrater zone and fractionated at 462°F. and at reduced pressure, about 10 mm Hg. absolute.

From that dehydration and fractionation there is recovered a TMA condensate containing a small amount of iso- and terephthalic acids. Upon cooling the condensate to 350°F. and 10 mm Hg. absolute pressure those di-acids crystallize and can be removed by pumping the 350°F. condensate through a filter. In this manner there can be recovered TMA equivalent to 95 to 97 percent of the total trimellitic acid in the oxidation effluent.

What is claimed is:

1. A process of recovery of trimellitic acid from the liquid effluent from an oxidation zone in which pseudocumene is oxidized under liquid phase conditions in the presence of:

acetic acid having downward from 5 weight percent water in an amount of 2 to 6 weight parts of such acetic acid per weight part of pseudocumene and in the presence of one or more heavy metal oxidation catalysts and a side chain oxidation initiator at a final oxidation temperature of 385° to 455°F., which recovery comprises the combination of the steps of concentrating the liquid oxidation effluent and precipitating a first crop of trimellitic acid by vaporizing a mixture of acetic acid and water vapors in a flash zone operated at a pressure below that at which such effluent was formed down to atmospheric pressure, displacing and replacing the mother liquor from that concentrate with acetic acid having downward from 5 weight percent water in an amount producing a first slurry having 60 to 70 percent solids and 40 to 30 percent liquid on a weight basis, concentrating the displaced mother liquor to a second concentrate by evaporation of all but 10 20 weight percent of its acetic acid content, displacing and replacing the acetic acid content of such second concentrate with acetic acid having downward from 5 weight percent water in an amount producing a second slurry having 60 to 70 percent solids and 40 to 30 percent liquid on a weight basis, combining such first and second slurries and removing acetic acid therefrom.

2. The process of claim 1 wherein mixtures of acetic acid and water vapors produced by the concentrating step are transferred as vapor streams for vapor feed to acetic acid concentration to a product having water content downward from 5 weight percent.

3. The process of claim 1 wherein the liquid oxidation effluent contains 0.36 to 0.50 parts trimellitic acid per part acetic acid, on weight basis the flash zone is operated at atmospheric pressure and the displacement and replacement of mother liquors by said low water content acetic acid and formation of such first and second slurries are achieved in liquid cyclones.

4. The process of claim 3 wherein acetic acid is removed from the first and second slurries by adding them to molten trimellitic anhydride at a temperature in the range of 350° to 465°F. and an amount of that anhydride equivalent to the trimellitic acid is withdrawn and distilled to recover trimellitic acid in the form of its intramolecular anhydride.

\* \* \* \* \*

PO-1050
(5/69)

UNITED STATES PATENT OFFICE
CERTIFICATE OF CORRECTION

Patent No. 3,853,924         Dated December 10, 1974

Inventor(s) DELBERT H. MEYER AND GEORGE E. JOHNSTON

It is certified that error appears in the above-identified patent and that said Letters Patent are hereby corrected as shown below:

| Col. | Line  |                                                                        |
|------|-------|------------------------------------------------------------------------|
| 2    | 20    | Delete "The residual 20 to 10 weight percent mother liquor"            |
| 2    | 21    | Delete "solvent."                                                      |
| 2    | 42-43 | "urethanetype" should be -- urethane-type --                           |
| 4    | 45    | "60percent" should be -- 60 percent --                                 |
| 5    | 24    | "10 20" should be -- 10 to 20 --                                       |
| 6    | 13    | Comma should be after "basis" rather than after "acid"                 |

Signed and sealed this 4th day of March 1975.

(SEAL)
Attest:

RUTH C. MASON
Attesting Officer

C. MARSHALL DANN
Commissioner of Patents
and Trademarks